United States Patent [19]

Canteleux

[11] Patent Number: 5,516,195
[45] Date of Patent: May 14, 1996

[54] ADJUSTABLE SEAT FRAMEWORKS AND TO SEATS EQUIPPED WITH SUCH FRAMEWORKS

[75] Inventor: Joël Canteleux, Armenonville, France

[73] Assignee: Bertrand Faure France, France

[21] Appl. No.: 357,235

[22] Filed: Dec. 12, 1994

[30] Foreign Application Priority Data

Dec. 28, 1993 [FR] France .................. 93 15751

[51] Int. Cl.$^6$ ............... A47C 3/025; A47C 3/026; A47C 3/027; A47C 7/14
[52] U.S. Cl. ............ 297/284.1; 297/374; 297/362
[58] Field of Search ............ 297/284.3, 284.1, 297/354.12, 362, 361.1, 358, 463.1, 374

[56] References Cited

U.S. PATENT DOCUMENTS

| | | | |
|---|---|---|---|
| 3,361,474 | 1/1968 | Kölle | 297/374 |
| 3,562,851 | 2/1971 | Köller | 297/374 X |
| 4,402,546 | 9/1983 | Johnson . | |
| 4,623,193 | 11/1986 | Lieker | 297/284.1 |
| 4,626,028 | 12/1986 | Hatsutta et al. . | |
| 4,993,778 | 2/1991 | Colin et al. . | |
| 5,058,953 | 10/1991 | Takagi et al. | 297/284.1 X |
| 5,112,109 | 5/1992 | Takada et al. . | |
| 5,286,088 | 2/1994 | Taylor et al. | 297/374 X |
| 5,340,194 | 8/1994 | Neumuller | 297/374 X |

FOREIGN PATENT DOCUMENTS

| | | | |
|---|---|---|---|
| 0080633 | 6/1983 | European Pat. Off. . | |
| 0363261 | 4/1990 | European Pat. Off. . | |
| 549538 | 6/1993 | European Pat. Off. | 297/374 |
| 2836606 | 3/1979 | Germany | 297/374 |
| 3003175 | 8/1981 | Germany | 297/362 |
| 3943008 | 7/1990 | Germany . | |
| 3911763 | 10/1990 | Germany . | |

*Primary Examiner*—Peter M. Cuomo
*Assistant Examiner*—Rodney B. White
*Attorney, Agent, or Firm*—Larson and Taylor

[57] ABSTRACT

An adjustable seat framework includes two frames articulated to one another, termed respectively first and second frames, joined by pivots, the first frame including at least one guide slot and the second frame including at least one associated operating slot, the associated guide and operating slots emerging in neighboring parallel planes and extending longitudinally in non-parallel directions, the adjustable framework further including, for each set of associated guide and operating slots, a roller which penetrates into said slots. An operating mechanism is provided for shifting the roller along the guide slot, which causes the rotation of the second frame about the pivots.

9 Claims, 4 Drawing Sheets

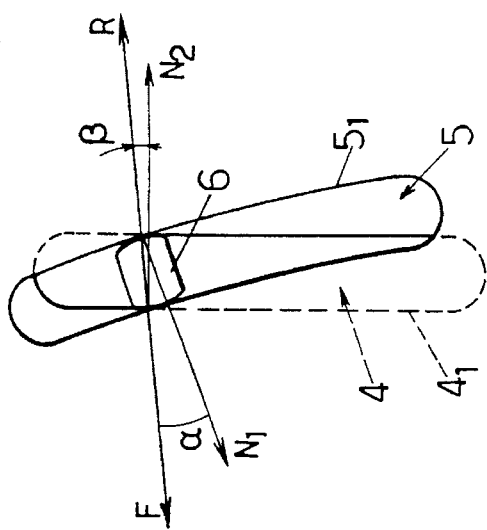
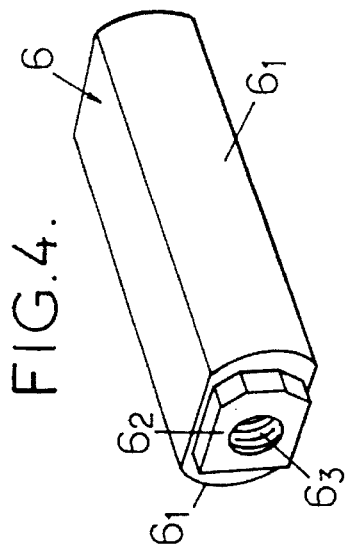
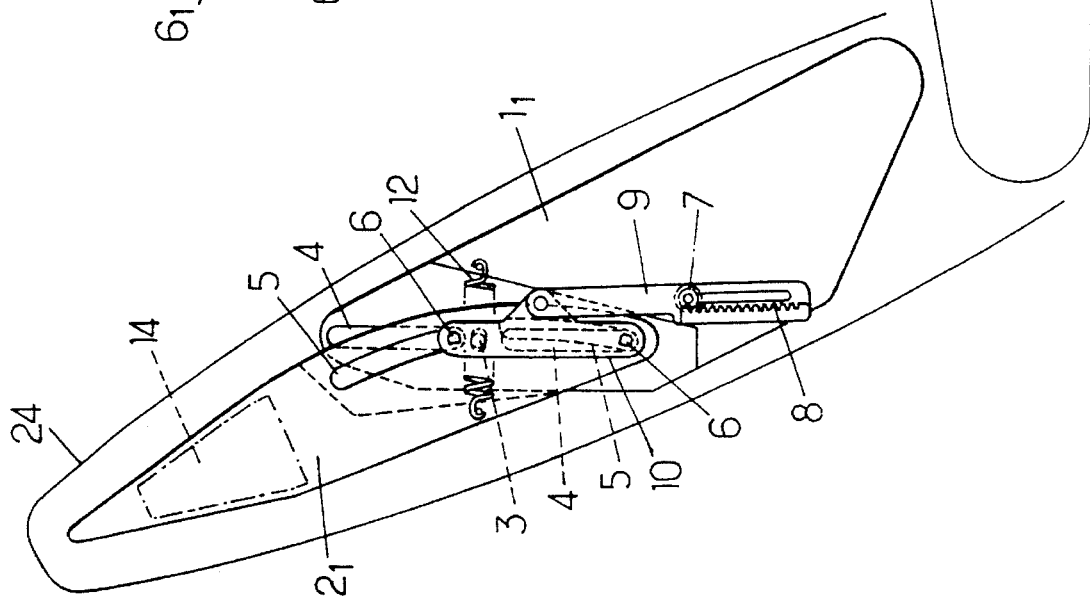

ADJUSTABLE SEAT FRAMEWORKS AND TO SEATS EQUIPPED WITH SUCH FRAMEWORKS

FIELD OF THE INVENTION

The present invention relates to adjustable seat frameworks, and the seats equipped with such frameworks.

In particular, the invention relates to seat frameworks including two frames articulated to one another, termed respectively first and second frame, the second frame being mounted on the first frame by means of pivots.

The invention applies particularly, although not exclusively, to vehicle seats, particularly those for motor vehicles.

BACKGROUND OF THE INVENTION

Most vehicle seats include a framework consisting of two frames articulated to one another, one for the seat part of the seat, the other for the backrest of the seat.

Furthermore, in some cases, the framework of the backrest of the seat itself consists of two frames articulated to one another, as illustrated, for example, in the document U.S. Pat. No. 4,626,028.

In all cases, these pivoting mounts must be particularly strong to be able to withstand the loads which may be exerted on the various parts of the seat, and they must also allow easy control of the pivoting movement of the second frame relative to the first. Usually, mechanisms with epicycloid gear trains are used for this, these being relatively complicated and expensive.

Moreover, the document EP-0,080,633 discloses an adjustable seat framework including two frames articulated to one another, termed respectively first and second frame, the second frame being mounted on the first frame by means of pivots, the first frame including at least one slot termed guide slot and the second frame including at least one slot termed operating slot, associated with said guide slot, the associated guide and operating slots emerging in neighboring parallel planes, said associated guide and operating slots extending longitudinally in non-parallel directions, the adjustable framework further including, for each set of associated guide and operating slots, a roller which penetrates into said associated guide and operating slots at the same time, thus imposing an angular position on the second frame relative to the first frame.

This seat framework includes a relatively complicated locking mechanism for the roller and furthermore it does not have any adjustment mechanism, adjustment of the inclination of the second frame being done by acting manually on this frame directly.

SUMMARY OF THE INVENTION

The object of the present invention especially is to provide an adjustable seat framework of the type defined hereinabove which is simple, easy to operate, and which withstands particularly well the loads which may be exerted on the second frame.

To this end, an adjustable seat framework as defined hereinabove is essentially one which further includes an operating mechanism acting on the roller in order to shift said roller along the guide slot, and in order thus to entrain the rotation of the second frame about the pivots.

In preferred embodiments of the invention, recourse is further had to one and/or other of the following provisions:

the shapes and arrangement of the guide and operating slots are designed so that a load exerted on the second frame does not cause the roller to slip in the slots, the guide slot and the operating slot each including a side which bears against the roller at a given point and which exerts a force on this roller when a load is exerted on the second frame, each of said sides exhibiting, at the abovementioned bearing point, a normal which together with the force exerted by this side on the roller forms an angle which is less than a predetermined angle, termed angle of friction, which is a characteristic of the respective materials of the roller and of the frame to which the slot in question belongs, the angle of friction constituting the limit angle beyond which the roller could slip in said slot in question; thus, when the angular position of the second frame has been adjusted by the operating means, this position can no longer be changed by a load exerted on the second frame, regardless of the value of this load;

the roller is immobilized in terms of rotation relative to a member belonging to the operating means designed to shift said roller, in order to prevent the roller from running freely in the guide and operating slots; thus, when the second frame is subjected to a load, even if the roller tends to slip on one side of one of the slots, this does not cause running on the side of the other slot; what is more, this arrangement makes it possible to use rollers which are not axisymmetric;

the adjustable framework includes two sets of associated guide and operating slots and two rollers which each interact with one set of associated guide and operating slots;

the pivots are mounted with clearance in openings which extend in a direction which is not parallel to the guide slots;

the means for operating the rollers include a link rod which joins the two rollers together;

a spring is mounted between the first and second frames to take up any assembly clearance between these two frames at rest;

the first frame constitutes the framework of a lower part of a seat backrest, and the second frame constitutes the framework of an upper part of the seat backrest;

the second frame includes a support to which a safety belt may be fastened.

The subject of the present invention is also a seat including an adjustable framework as defined hereinabove which constitutes the framework of its backrest, and a safety belt winder which is fastened to the support of the second frame.

BRIEF DESCRIPTION OF THE DRAWINGS

Other features and advantages of the invention will emerge during the following description of one of its embodiments, given by way of non-limiting example with regard to the appended drawings.

In the drawings:

FIG. 4 is a detail of one of the rollers of the framework of FIG. 1, FIG. 5 is a diagrammatic view of a vehicle seat including the framework of FIG. 1, the upper part of this framework being in the lowered position, and FIG. 6 is a diagrammatic view illustrating the loads exerted on the roller of FIG. 4.

DESCRIPTION OF THE PREFERRED EMBODIMENT OF THE INVENTION

Figure 1:
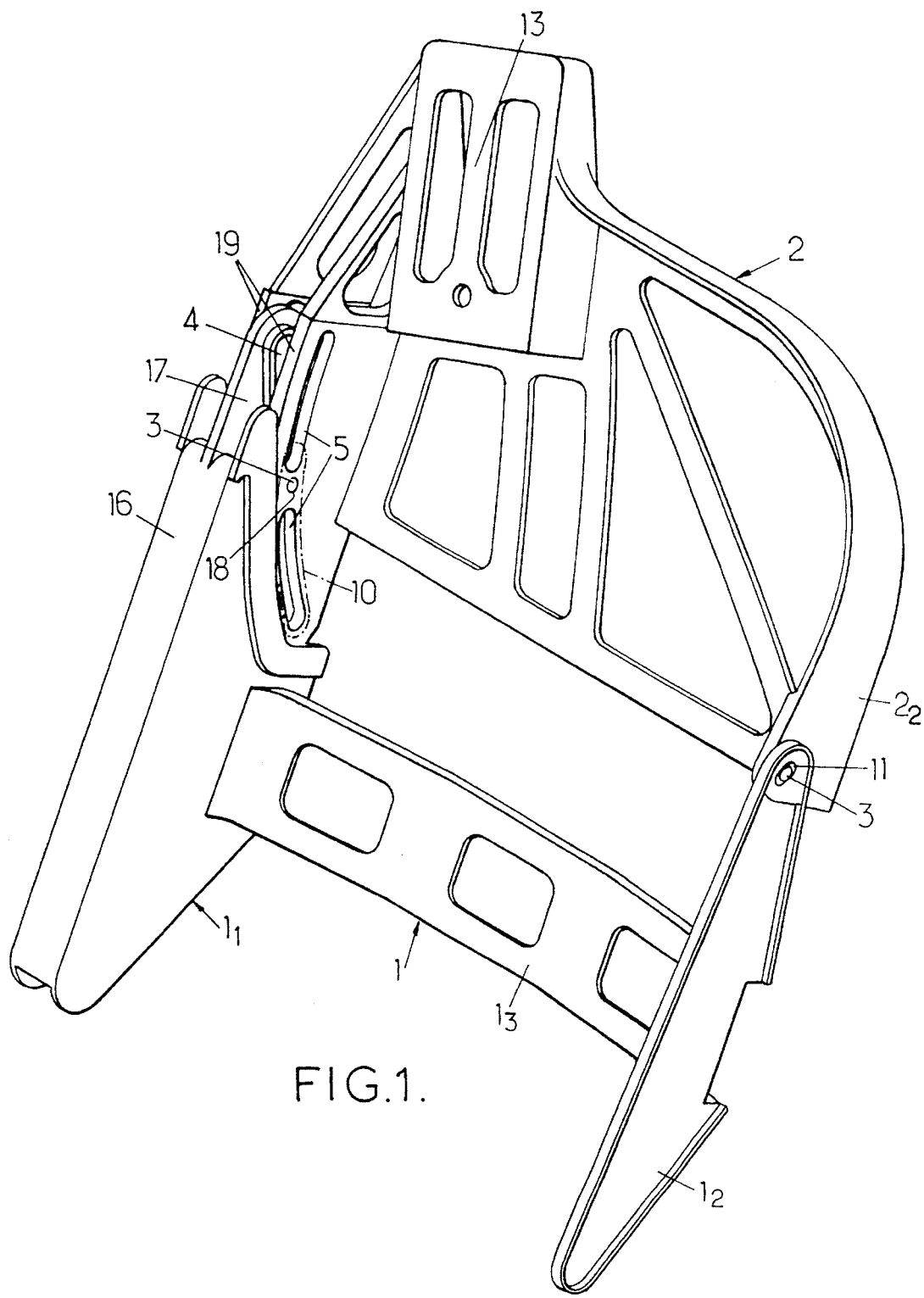
FIG. 1 is a perspective view of a backrest framework for a motor vehicle seat, according to one embodiment of the invention.

In the embodiment represented in the drawings, the invention is applied to a motor vehicle seat including a backrest 24 and a seat part 25, visible in FIG. 5.

FIG. 1 represents the framework of the backrest 24 of the seat, this framework consisting of a lower frame 1 to which an upper frame 2 is articulated.

The lower frame 1 consists of two lateral flanges $1_1$, $1_2$ located in parallel vertical planes and secured together by a spacer piece $1_3$.

Conventionally, each of the lateral flanges $1_1$, $1_2$ may be mounted at its lower part on the framework of the seat part 25 of the seat, for example by means of articulations. It is thus possible to adjust the inclination of the whole of the backrest 24 of the seat.

In the example represented, the lateral flange 12 has the shape of a plate of plane overall shape, whereas the flange $1_1$ includes a thick lower part 16 and an upper part 17 with a smaller thickness, having the overall shape of a plane plate.

The upper part 17 of the flange $1_1$ includes two through-slots 4 (see FIGS. 2 and 3), termed guide slots, which in the example represented are straight and aligned relative to each other.

Finally, the upper part 17 of the flange $1_1$ includes an oblong opening 11 (see FIGS. 2 and 3) which extends generally in a direction which is not parallel to the direction of the guide slots 4, and in particular, in a direction perpendicular to the direction of said guide slots. The center of symmetry of the oblong opening 11 is located, in the example represented, in the alignment of the two guide slots 4.

Moreover, the flange $1_2$ also includes, in its upper part, an oblong opening 11 (FIG. 1) located in register with the oblong opening 11 of the upper part 17 of the flange $1_1$.

The upper frame 2 of the seat framework is a rigid structure which includes a support 13 allowing a safety belt winder 14 (FIG. 5) to be fastened. The upper frame 2 also has two lateral flanges $2_1$, $2_2$ which are located in mutually parallel vertical planes parallel to the flanges $1_1$, $1_2$ of the lower frame 1.

The flange $2_2$ is pierced with a cylindrical bore (not represented), and a pivot pin 3 passes through this cylindrical bore as well as through the oblong opening 11 in the flange $1_2$.

What is more, the flange $2_1$ of the upper frame 2 includes two vertical and parallel plane plates 19 which are located like a clevis on either side of the upper part 17 of the flange $1_1$. Each of these two plates 19 is pierced with a cylindrical bore 18 located in register with the cylindrical bore in the flange $2_1$, these two cylindrical bores 18 having a pivot pin 3 passing through them, this pivot pin also passing through the oblong opening 11 in the upper part 17 of the flange $1_1$.

Each of the two plates 19 includes two through-slots 5, termed operating slots, which in the general case extend longitudinally in a way which is not parallel to the guide slots 4, and which in the example represented have a curved shape, with the center of curvature located toward the rear of the backrest of the seat. More particularly, in the example represented, the operating slots 5 each have the shape of an arc of a circle.

In all cases, the slots 5 must not have the shape of an arc of a circle centered on the pivot pin 3.

Each operating slot 5 of one of the plates 19 is located in register with an operating slot of the other plate 19. Additionally, each pair of operating slots 5 in register is associated with a guide slot 4 which is not parallel to said two operating slots 5.

Figure 2:
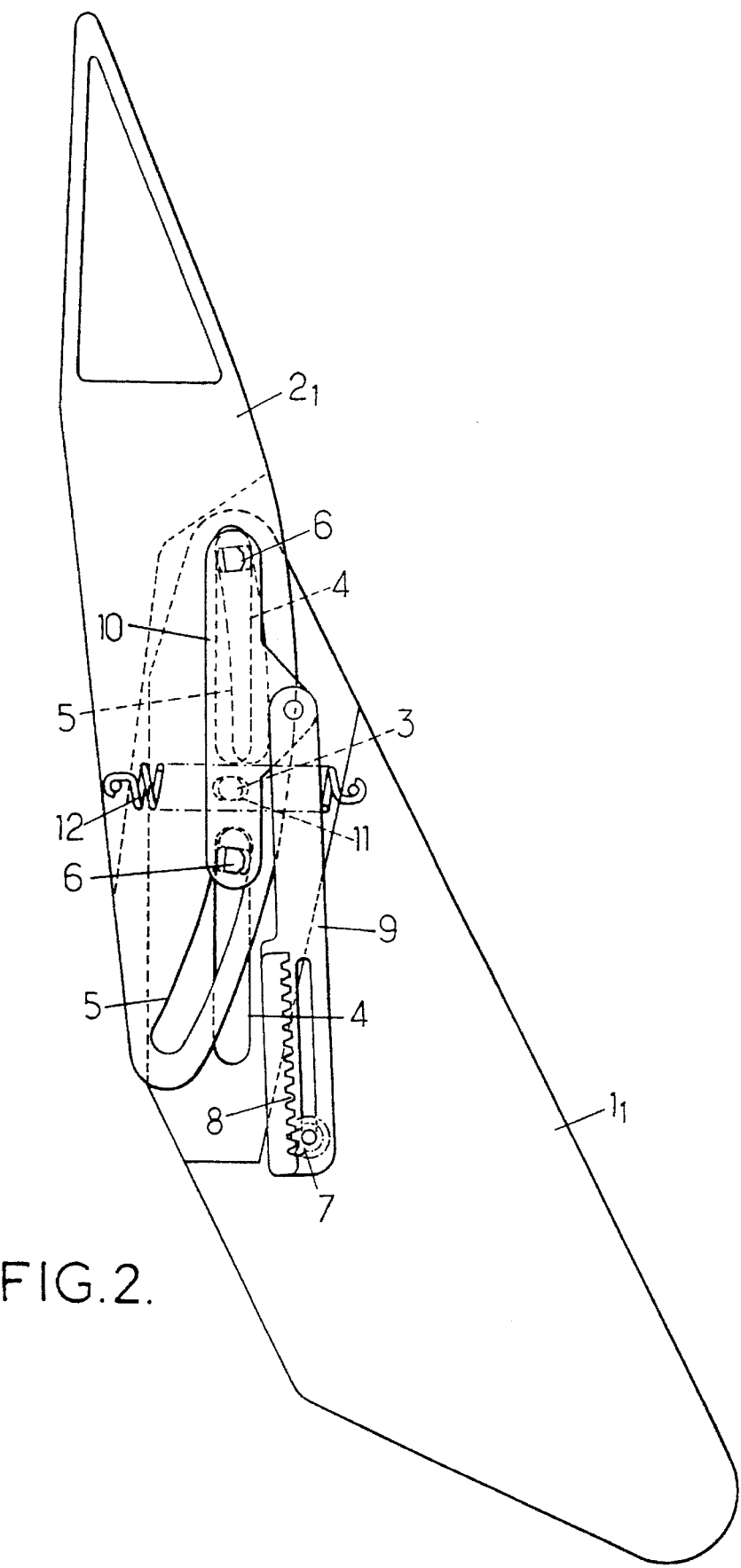
FIG. 2 is a simplified diagrammatic view of one side of the framework of FIG. 1, the upper part of this framework being in the raised position.
Figure 3:
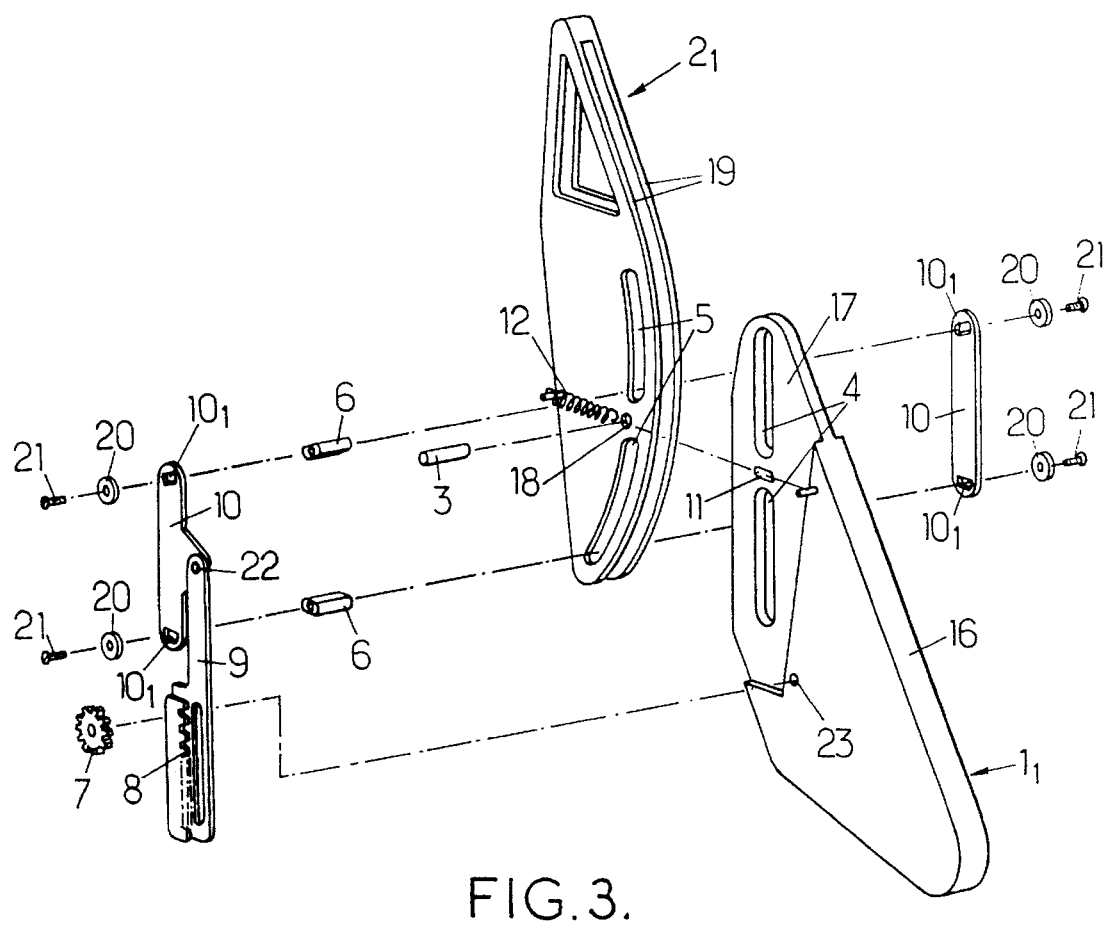
FIG. 3 is an exploded diagrammatic view of the side of the framework which is represented in FIG. 2.

As can be seen particularly in FIGS. 2 and 3, each guide slot 4 has a roller 6 passing through it, and this roller also passes through two operating slots 5 each belonging to one plate 19 of the flange $2_1$.

One of these rollers is represented in detail in FIG. 4. In the particular embodiment represented in this figure, the roller 6 has two curved opposed faces $6_1$ which are intended to interact with the sides of the slots 4 and 5. Additionally, the roller 6 extends axially between two ends which each include a projecting head $6_2$ which does not have symmetry of revolution, this head $6_2$ being pierced with an axial threaded bore $6_3$.

As represented particularly in FIG. 3, the two rollers 6 are joined together by two link rods 10 located on each side of the plates 19. Each link rod 10 has two recesses $10_1$ which have a shape which complements the heads $6_2$ of the rollers, so that said heads $6_2$ of the rollers are fitted without play into the recesses $10_1$. Thus, the rollers 6 are immobilized in terms of rotation relative to the link rods 10, so that they shift in the slots 4, 5 solely by sliding. What is more, the link rods 10 are held on the rollers 6 by washers 20, themselves retained by screws 21 screwed into the threaded bores $6_3$ of the rollers.

One of the link rods 10, for example the one located toward the outside of the seat, is connected to an operating rod 9 via a pivot 22, this operating rod 9 being integral with a rack 8 which meshes with a pinion 7 whose spindle is mounted in a bore 23 of the flange $1_1$. The pinion 7 may be operated directly or indirectly by a handwheel accessible to a user of the seat, or by an electric motor.

Finally, a spring 12 is mounted under tension between the flanges $1_1$ and $1_2$, so as to take up any assembly clearance which there may be between said flanges at rest, this being in order to avoid vibrations between these two components while the vehicle is traveling along.

The device which has just been described operates as follows. When the two rollers 6 are situated respectively at the upper ends of the two guide slots 4, as represented in FIG. 2, the upper frame 2 is in a raised position, that is to say that it forms an angle less than 180° with the lower frame 1. When the rollers 6 are shifted downward in the guide slots 4, by means of the pinion 7, of the rack 8, of the operating rod 9 and of the link rods 10, the rollers 6 give the upper frame 2 a movement of rotation about the pivots 3, this movement being given by the action of the rollers 6 on the operating slots 5.

In the course of this movement, the upper frame 2 pivots backward as far as the position represented in FIG. 5, in which the rollers 6 are situated at the lower end of the guide slots 4, and in which the upper frame 2 forms, with the lower frame 1, an angle substantially equal to 180°. In the course of said movement, the pivots 3, situated on each side of the seat, shift slightly in the oblong holes 11 in the flanges $1_1$, $1_2$.

In order to avoid the loads exerted on the upper frame 2, especially the loads of the user resting against them or the tensile loadings due to the safety belt fastened to the support 13 by the winder 14, altering the setting of the seat and/or damaging the adjustment mechanism, it is desirable to contrive for a load exerted on the upper frame 2 not to cause any slippage of the rollers 6 in their slots. This result is achieved as explained hereinbelow.

As represented in FIG. 6, when a load is exerted on the upper frame 2, this load results in a force F exerted on each roller 6 by a side $5_1$ of the two operating slots 5 in which this roller is engaged (each plate 19 exerts a force F/2 on the roller 6). This force F is exerted at the point of contact between the side $5_1$ and the roller 6. The force F forms an angle $\alpha$ with the normal $N_1$ common to the side $5_1$ and to the radius of curvature of the roller 6, in the region of the point of contact between this side $5_1$ and the roller 6.

What is more, the roller 6 is subjected to a reaction force R from a side $4_1$ of the guide slot 4 associated with the two abovementioned operating slots 5. This force R is exerted at the point of contact between the side $4_1$ and the roller 6, it has the same value as the force F, it points in the same direction as and in an opposite sense to said force F and it forms an angle $\beta$ with the normal $N_2$ common to the side $4_1$ and to the radius of curvature of the roller 6, at the region of the point of contact between said side $4_1$ and the roller 6.

In order to avoid a load exerted on the upper frame 2 resulting in unintended slippage of the rollers 6 in the slots, it is necessary for the angle $\alpha$ to be less than the angle of friction $\alpha_0$ between the roller 6 and the side of the operating slots 5, and for the angle $\beta$ to be less than the angle of friction $\beta_0$ between the roller 6 and the side of the guide slot 4.

These angles $\alpha_0$ and $\beta_0$ are characteristic of the respective materials of the lower frame 1 and upper frame 2 and of the roller 6. When the frames 1 and 2 are made of the same material, the angles $\alpha_0$ and $\beta_0$ are equal.

In order to make sure that there is no risk of the seat setting altering in the event of substantial loads exerted on the upper frame 2, the arrangement and curvature of the operating slots 5 are thus chosen so that, over the entire travel of the rollers 6, the angles $\alpha$ and $\beta$ are respectively less than $\alpha_0$ and $\beta_0$.

The invention is not limited to the particular example which has just been described. In contrast it covers all alternatives thereof, especially those in which:

the flange $2_1$ includes a single plate 19 and the flange $1_1$ includes two plates 17 located like a clevis around the single plate 19, the flange $2_1$ includes a single plate 19 mounted so that it overhangs one side of the plate 17, the guide slots 4 are curved while the operating slots are straight, the guide slots 4 and operating slots 5 are all curved, the device includes a single roller 6 which can be shifted in a guide slot 4 and an operating slot 5, the oblong openings 11 then being replaced by cylindrical bores so that the pivot 3 is mounted substantially without play on the lower frame 1, the lower frame 1 includes cylindrical bores 18 and the upper frame 2 includes the oblong openings 11, the pinion 7 and rack 8 are replaced by a screw jack, or by any other operating means, the frames 1 and 2 no longer constitute the framework of a seat backrest, but the framework of the seat part of a seat.

I claim:

1. An adjustable seat framework including first and second frames articulated to one another, the second frame being rotatively mounted on the first frame by means of pivots, the seat framework having two sets of associated guide and operating slots, each of said sets of slots including at least one of said guide slots being positioned in the first frame, and at least one of said operating slots being positioned in the second frame, the associated guide and operating slots being formed in neighboring parallel plates, said associated guide and operating slots extending longitudinally in non-parallel directions, the adjustable framework further including two rollers interacting respectively with the two sets of associated guide and operating slots, each corresponding roller penetrating simultaneously into one set of said associated guide and operating slots, to impose an angular position on the second frame relative to the first frame, the adjustable framework further including a link rod joining the two rollers together and an operating mechanism acting on said link rod in order to shift said rollers along the guide slots and to entrain rotation of the second frame about the pivots, the guide and operating slots being arranged so that a load exerted on the second frame does not cause the rollers to slip in the slots, irrespective of the operating mechanism.

2. The seat framework as claimed in claim 1, wherein the guide and operating slots each include a side which bears against the corresponding roller at a given bearing point and which exerts a force on the corresponding roller when a load is exerted on the second frame, each of said sides exhibiting, at the bearing point, a normal which together with the force exerted by each of said sides on the roller forms an angle which is less than a predetermined angle of friction characteristic of respective materials of the roller and of the frame, the angle of friction being a limit angle beyond which the roller could slip in said slots.

3. The seat framework as claimed in claim 2, wherein the rollers are immobilized in terms of rotation relative to the link rod in order to prevent the rollers from running freely in the guide and operating slots.

4. The seat framework as claimed in claim 1, wherein the pivots are mounted with clearance in oblong openings which extend in a direction which is not parallel to the guide slots.

5. The seat framework as claimed in claim 4, further including a spring mounted between the first and second frames to take up any assembly clearance between said two frames at rest.

6. A seat backrest comprising a lower part, and an upper part adjustable relative to said lower part, said upper and lower parts having two sets of associated guide and operating slots, said lower part comprising a first frame including at least one of said guide slots, said upper part comprising a second frame including at least one of said operating slots, the second frame being rotatively mounted on the first frame by means of pivots the associated guide and operating slots being formed in neighboring parallel plates, said associated guide and operating slots extending longitudinally in non-parallel directions, the seat backrest further including two rollers interacting respectively with the two sets of associated guide and operating slots, each roller penetrating corresponding simultaneously into one set of said associated guide and operating slots, to impose an angular position on the second frame relative to the first frame, the seat backrest further including a link rod joining the two rollers together and an operating mechanism acting on said link rod in order to shift said rollers along the guide slots and to entrain rotation of the second frame about the pivots, the guide and operating slots being arranged so that a load exerted on the second frame does not cause the rollers to slip in the slots, irrespective of the operating mechanism.

7. The seat framework as claimed in claim 6, wherein the guide and operating slots each include a side which bears against the corresponding roller at a given bearing point and which exerts a force on the corresponding roller when a load is exerted on the second frame, each of said sides exhibiting, at the bearing point, a normal which together with the force exerted by each of said sides on the roller forms an angle which is less than a predetermined angle of friction characteristic of respective materials of the roller and of the frame, the angle of friction being a limit angle beyond which the roller could slip in said slots.

8. The seat backrest as claimed in claim 7 wherein said second frame includes a support to which a safety belt is fastenable.

9. The seat backrest as claimed in claim 8 further comprising a safety belt winder fastened to said support.

* * * * *